United States Patent [19]

Taghezout

[11] Patent Number: 5,289,071
[45] Date of Patent: Feb. 22, 1994

[54] POLYPHASE ELECTROMAGETIC TRANSDUCER WITH A PERMANENT MAGNET, IN PARTICULAR A DRIVE MOTOR

[75] Inventor: Daho Taghezout, Granges, Switzerland

[73] Assignee: ETA SA Fabriques d'Ebauches, Granges, Switzerland

[21] Appl. No.: 918,672

[22] Filed: Jul. 22, 1992

[30] Foreign Application Priority Data

Jul. 22, 1991 [FR] France .................. 91 09330

[51] Int. Cl.⁵ .............................................. H02K 1/12
[52] U.S. Cl. ...................................... 310/254; 310/112; 310/156; 310/179; 310/184
[58] Field of Search .................. 310/49 R, 162, 163, 310/164, 165, 156, 40 MM, 112, 218, 180, 184, 208, 254, 256, 257, 179

[56] References Cited

U.S. PATENT DOCUMENTS

| | | | |
|---|---|---|---|
| 4,371,821 | 2/1983 | Laesser et al. | 310/49 R |
| 4,629,924 | 12/1986 | Grosjean | 310/49 R |
| 4,680,494 | 7/1987 | Grosjean | 310/156 |
| 5,130,594 | 7/1992 | Taghezout et al. | 310/156 |

FOREIGN PATENT DOCUMENTS

| | | |
|---|---|---|
| 0116378 | 8/1984 | European Pat. Off. |
| 2503952 | 10/1982 | France |
| 8902670 | 3/1989 | PCT Int'l Appl. |
| 112926 | 11/1918 | United Kingdom |
| 263287 | 12/1926 | United Kingdom |

OTHER PUBLICATIONS

Patent Abstracts of Japan, vol. 12, No. 310, Aug. 23, 1988.

Primary Examiner—R. Skudy
Attorney, Agent, or Firm—Weil, Gotshal & Manges

[57] ABSTRACT

This transducer comprises a rotor (18) and a stator (2) having at least three magnetic poles (12a, 12b, 12c) each terminating with a polar lug (24a, 24b, 24c). The polar lugs are connected together by magnetic flux guide branches (8a, 8b, 8c) each bearing an excitation coil (10a, 10b, 10c). The stator is made up from two principal parts (4, 6) situated for the most part in two different planes while the magnetic flux guide branches (8a, 8b, 8c) are situated in a region between such planes. This transducer exhibits a compact structure and may be inexpensively manufactured by simple blanking of the stator parts. In particular it finds application in the driving of small dimension precision mechanisms such as timepieces.

11 Claims, 10 Drawing Sheets

POLYPHASE ELECTROMAGETIC TRANSDUCER WITH A PERMANENT MAGNET, IN PARTICULAR A DRIVE MOTOR

The present invention concerns an electro-mechanical transducer of the polyphase electromagnetic type and including a permanent magnet rotor. Such transducer may be employed as a motor or generator. More specifically, the present invention concerns an electromagnetic motor including at least three phases, each of such phases being capable of energizing the motor alternatively or simultaneously in accordance with the chosen mode of operation. Such motor is intended in particular to drive a mechanism of small dimensions, for example an horological mechanism.

BACKGROUND OF THE INVENTION

From the patent application FR 90 05240 there is known a three-phase electromagnetic motor including a rotor, having a preferably bipolar permanent magnet and a stator provided on the one hand with a peripheral stator portion forming a magnetic circuit of low magnetic reluctance and, on the other hand, a central stator portion formed to accommodate the rotor, such central stator portion being surrounded by the peripheral stator portion. Three coils mounted on three branches couple the central stator portion to the peripheral stator portion. The central stator portion exhibits three poles, each comprising a polar expansion partially surrounding the stator hole, the polar expansions being separated from one another by necks of high magnetic reluctance. The stator exhibits a planar structure located in a single common plane, the three branches including the three magnetic flux supplying coils being situated in a second plane parallel to the stator plane and neighbouring such plane.

Such three-phase motor of the star type presents the advantage of furnishing a non-zero average couple in successive supplying of the phases ("ON" phase sequence). However, it has the disadvantage of having a peripheral stator portion for the return of the magnetic flux. This structure necessitates a spreading out of the stator which renders the motor relatively cumbersome.

One of the purposes of the present invention is to overcome the disadvantage of this motor whilst maintaining the feeding and high yield advantages which it presents. Another purpose of the invention is to further improve the yield of such three-phase motor of the star type in increasing the magnetic coupling between the rotor and the magnetic flux supplying coils. Finally, it is sought to achieve these purposes whilst maintaining a relatively low manufacturing cost, that is to say, in providing an electromagnetic motor of simple construction and easy assembly.

SUMMARY OF THE INVENTION

The present invention thus has as object a polyphase electromagnetic transducer, in particular a drive motor comprising:

a stator including first and second principal parts, the first principal part defining on the one hand a stator hole and on the other hand at least three magnetic poles, each of such magnetic poles comprising a polar expansion at one end partially defining said stator hole and a polar lug substantially at the other end serving as magnetic contact, said polar expansions being separated from one another by zones of high magnetic reluctance, said second principal stator part serving to form the magnetic circuits of said motor, said stator further including at least three magnetic flux guidance branches, each of such branches magnetically coupling a polar lug of said first principal stator part to said second principal stator part;

a rotor rotatably mounted in said stator hole and including at least one permanent magnet, such rotor being adapted to spin in order to furnish a driving couple to a mechanism to be driven;

at least two coils each mounted on one of said magnetic flux guidance branches, each a coil being intended for coupling to an electrical supply source so as to generate a magnetic flux in its associated branch;

such transducer being characterized in that said first and second principal stator parts are situated primarily in two different planes, each of said magnetic flux guidance branches bearing one of said coils being situated primarily in a region intermediate said principal stator part planes.

In a preferred embodiment of the invention, the two principal stator parts have a planar form and are situated in parallel planes, the second stator part being primarily situated in a region superposed onto the substantially circular region defined by the first principal stator part. Likewise, the magnetic flux guidance branches situated in the plane intermediate the two planes of the principal stator parts have also a planar form. Additionally, a special form of this preferred embodiment exhibits a similar form for the two principal stator parts, the rotor including two permanent bipolar magnets, each of said two magnets being associated with the magnetic poles of one of the two principal stator parts, the rotor including two permanent bipolar magnets, each of said two magnets being associated with the magnetic poles of one of the two principal stator parts.

There results from these characteristics a polyphase transducer which, as a motor, is capable of furnishing a non-zero average couple in successive feeding of the phases, such transducer having furthermore a compact structure. In the preferred embodiment, the stator extends primarily over three neighbouring parallel planes and all the stator pieces have a planar form presenting no difficulty in blanking, which brings about relatively low production costs. If beforehand the rotor is housed for instance in a small cage, the assembly of the motor according to the invention is easily effected. Finally, the special form of the preferred embodiment with two bipolar permanent magnets enables the obtaining of a very good yield of the transducer according to the invention, the magnetic coupling magnets-to-coils being then considerably increased with a like space requirement and without thereby increasing the radius of the rotor.

The invention will be better understood with the help of the description to follow and drawings which illustrate it solely by way of example.

DESCRIPTION OF THE PREFERRED EMBODIMENTS

Figure 1:
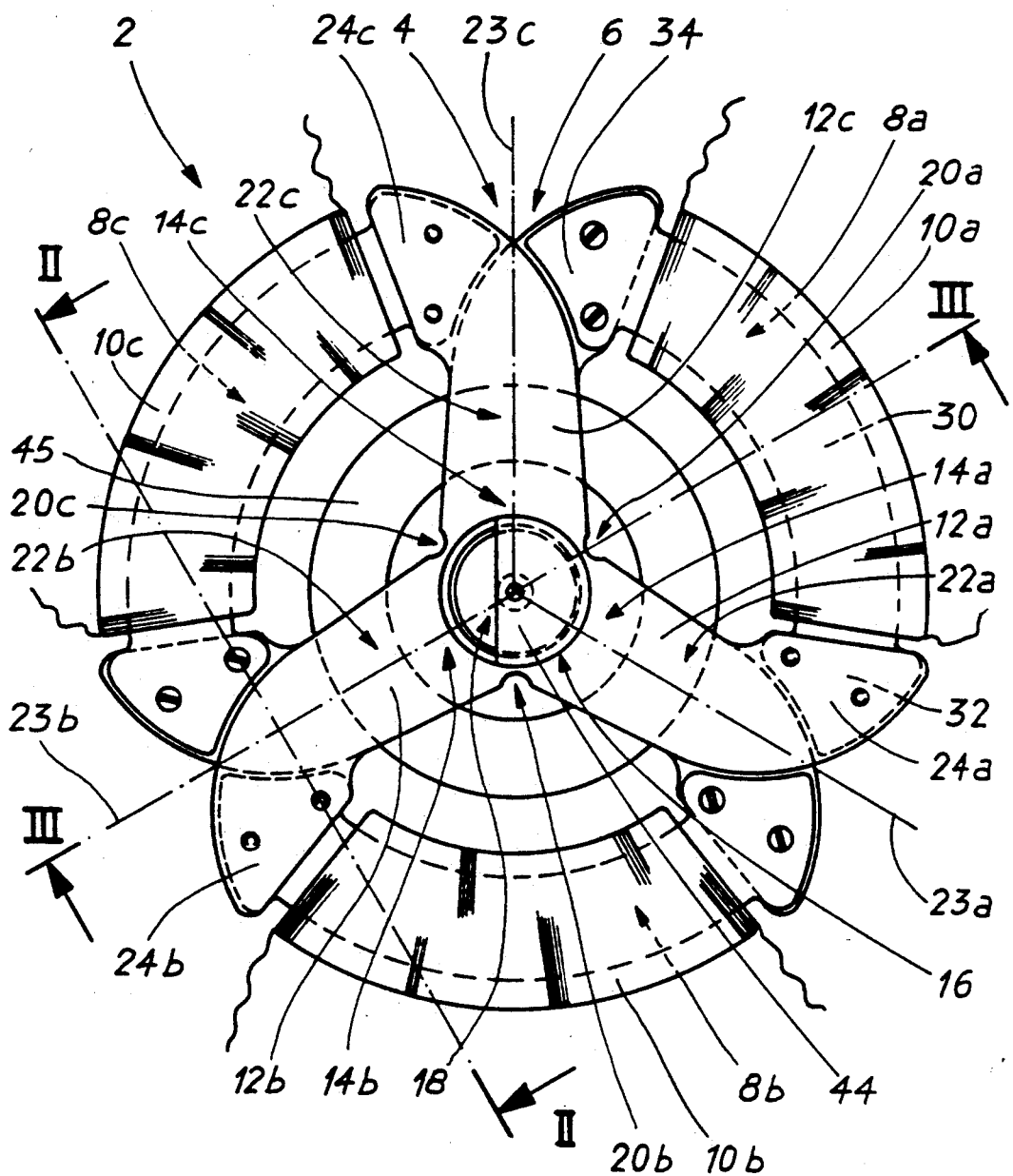
FIG. 1 represents a plan view of a first embodiment of a three-phase motor according to the invention.
Figure 2:
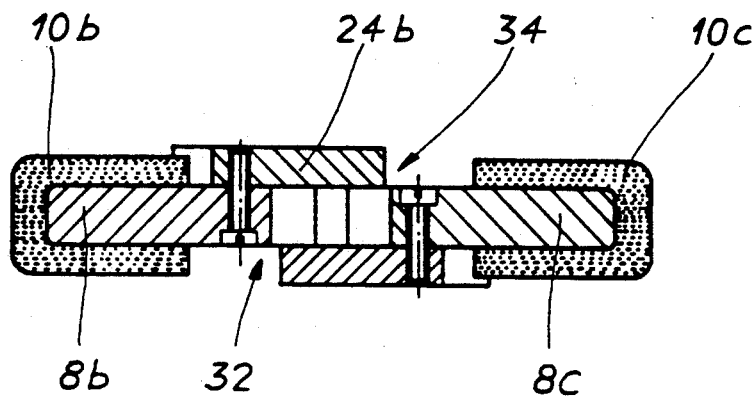
FIGS. 2 and 3 are cross-section views of the motor according to lines II—II and III—III of FIG. 1.

Referring to FIGS. 1 to 5, there will be described hereinafter, by way of example, a transducer according to the invention being a first embodiment of an electromagnetic magnetic motor, such motor being of the symmetrical three-phase type.

The stator 2 of such three-phase motor possesses primarily a structure on three neighbouring parallel planes. In the two outer planes are situated a first and respectively a second principal stator part 4 and 6. Such two principal stator parts 4 and 6 are each formed from a single common piece superposed one onto the other and are magnetically coupled by means of branches 8a, 8b, 8c of substantially rectangular cross-section serving as guidance means for the magnetic flux between such two principal stator parts 4 and 6. On each of such branches 8a, 8b, 8c is provided a coil 10a, 10b, 10c intended to be coupled to an electrical supply source for generating a magnetic flux in the branch with which it is associated.

The first principal stator part 4 exhibits a propeller form. It is primarily formed by three magnetic poles 12a, 12b, 12c. Each of such magnetic poles 12a, 12b, 12c comprises a polar expansion 14a, 14b, 14c situated in the central region of the stator, each of such polar expansions partially defining a stator hole 16 provided for the rotor 18. Such three polar expansions 14a, 14b, 14c are connected to one another by necks 20a, 20b, 20c defining zones of high magnetic reluctance.

Each polar expansion 14a, 14b, 14c is extended by a polar arm 22a, 22b, 22c extending radially to the stator hole 16. The three polar arms 22a, 22b, 22c are arranged in a regular manner around the stator hole 16. Finally, each polar arm 22a, 22b, 22c terminates with a polar lug 24a, 24b, 24c extending obliquely relative to the radial direction given by the radial lines 23a, 23b, 23c defined respectively by the median of the two necks 20a and 20b, 20b and 20c, 20c and 20a defining the polar expansions of the magnetic poles in question.

It will be noted that the three magnetic poles 12a, 12b, 12c are curved in the same sense and have an identical form, such poles being angularly spread apart relative to one another at an angle of 120°.

The second principal stator part 6 is of a form identical to the first principal stator part 4. However, this second principal stator part 6 is arranged in an inverted or turned-over manner relative to the first principal stator part 4. This second principal stator part 6 is arranged in a manner such that the polar expansions of its three magnetic poles are exactly superposed onto the corresponding polar expansions of the first principal stator part 4. Thus, the polar arm and the polar lug of a pole of such second principal stator part 6 are symmetrically arranged relative to the corresponding polar arm and polar lug of the magnetic pole of the first stator part 4, the axis of symmetry being given by the radial lines 23a, 23b, 23c. The polar lugs of each of the two superposed magnetic poles belonging to the first, or respectively second principal stator part 4 and 6, are situated primarily on one and the other side of the radial lines 23a, 23b, 23c.

Each magnetic flux guidance branch 8a, 8b, 8c is formed from a core 30 and from respective first and second coupling lugs 32 and 34. Each of such branches 8a, 8b, 8c has a planar form and is situated in the plane intermediate to the first and second stator parts 4 and 6. Each of such magnetic flux guidance branches 8a, 8b, 8c is inwardly curved in such a manner that the first coupling lug 32 is superposed respectively onto the polar lugs 24a, 24b, 24c from respective first magnetic poles 12a, 12b, 12c belonging to the first principal stator part 4 and that simultaneously the second coupling lug 34 of such magnetic flux guidance branch is superposed onto the polar lug of a second pole of the second principal stator part 6, such second pole being shifted by 120° relative to said first pole and inwardly curved from the side of such first pole. Each coupling lug 32, 34 is formed in a manner such that the superposition surface with the corresponding polar lug is situated entirely in the non-superposition region of the pole to which such lug belongs and of the pole of the other principal stator part which faces it. Thus, each magnetic pole belonging to the first stator part 4 is magnetically decoupled from the magnetic pole of the second principal stator part 6 which faces it. Furthermore, there results from the characteristics described previously that each coupling lug 32, 34 is situated entirely on one side of the radial lines 23a, 23b, 23c defined by the polar arms 22a, 22b, 22c. It will be further noted that each of the coils 10a, 10b, 10c of the motor is arranged on a circular arc of the same center and radius.

Figure 3:
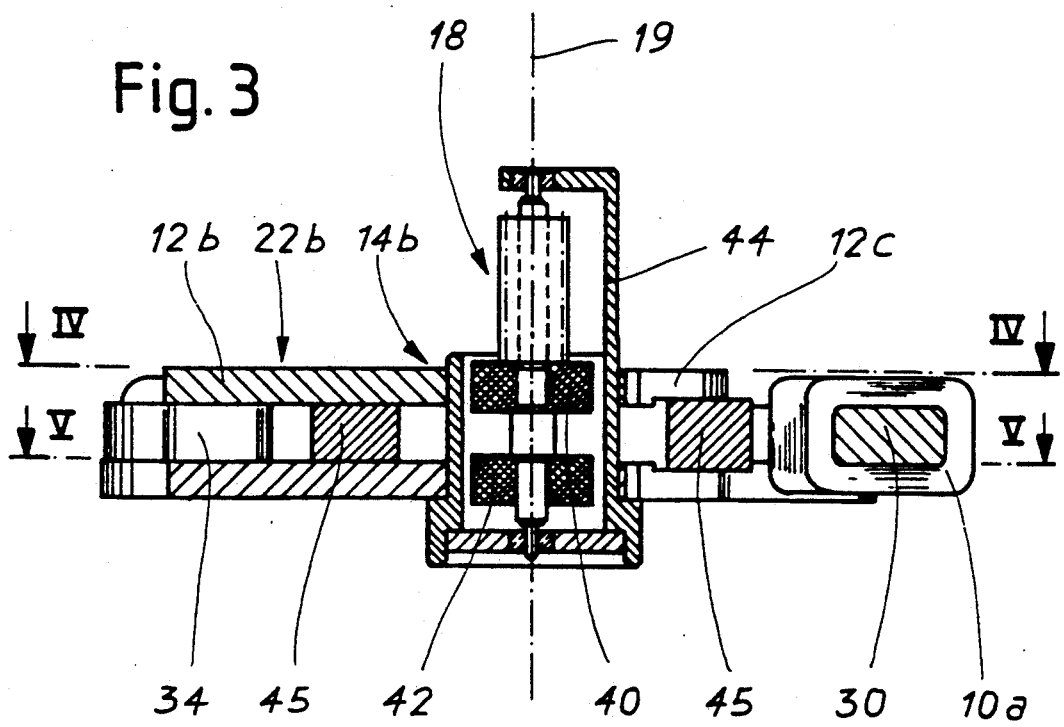
Figure 4:
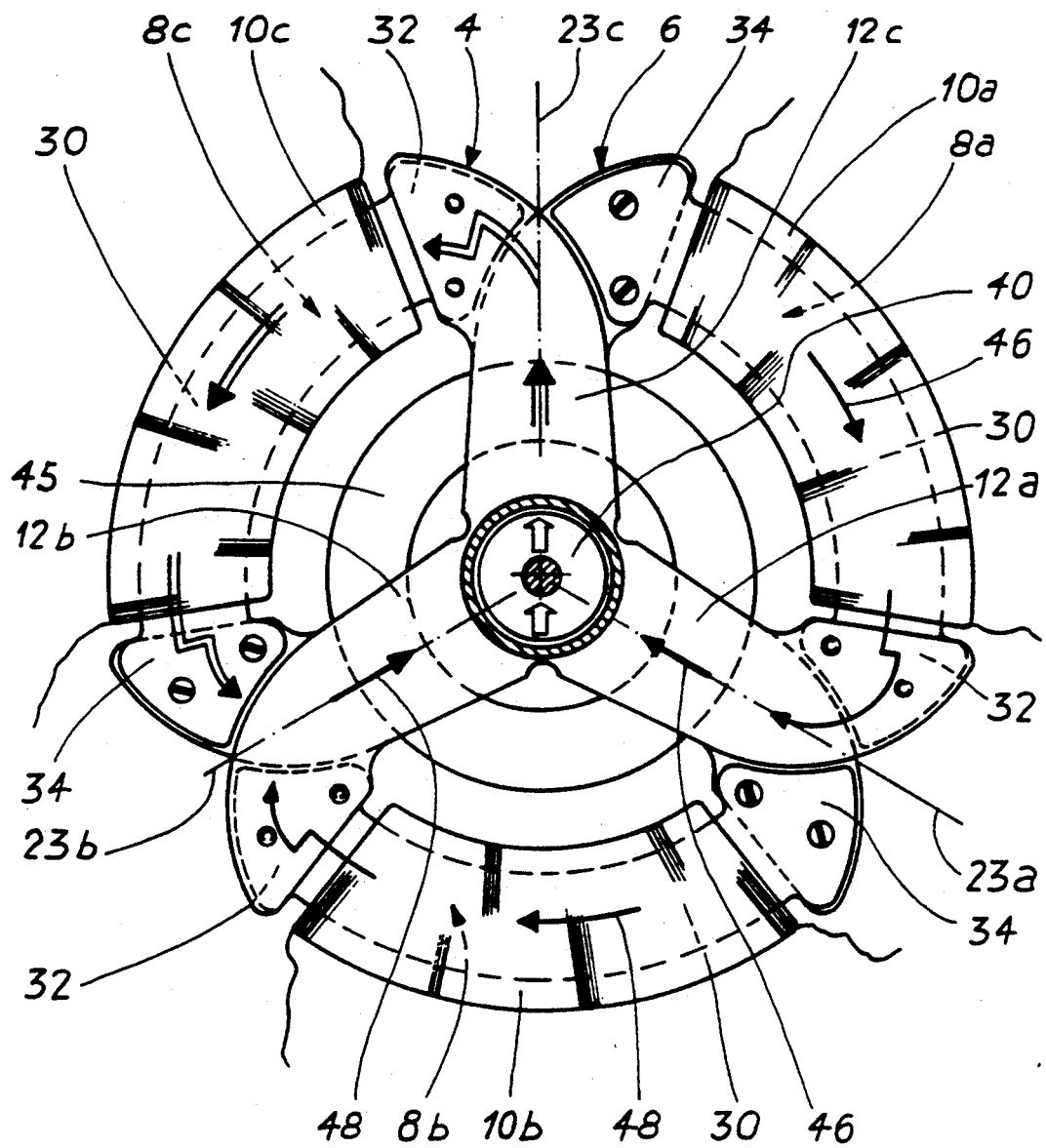
FIGS. 4 and 5 are cross-section views of the motor according to lines IV—IV and V—V of FIG. 3.
Figure 5:
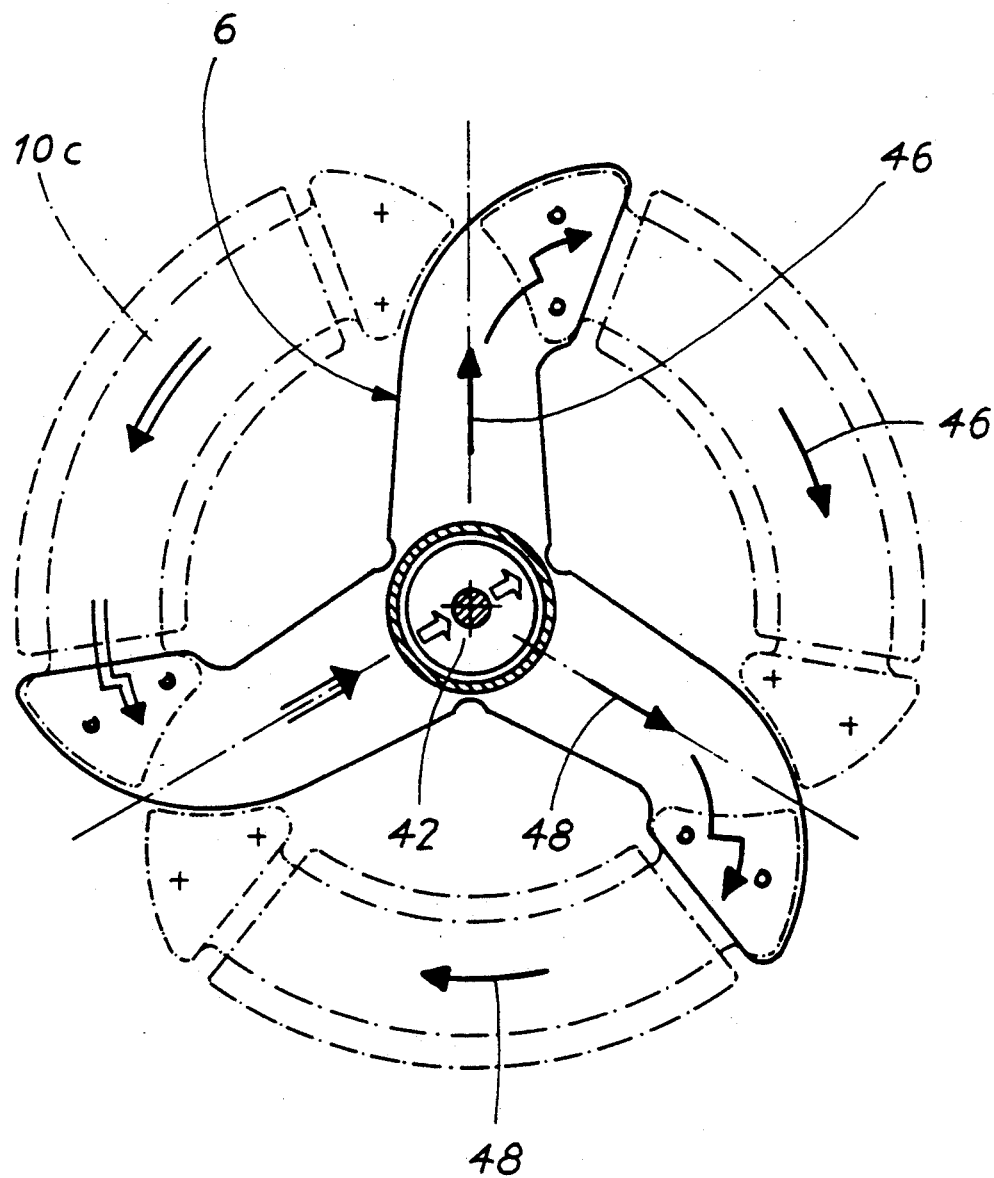

As shown by FIGS. 3 to 5, the rotor 18 is adapted to spin around the rotation axis 19 perpendicular to the general plane of the stator and includes two permanent magnets 40, 42 the directions of magnetization of which are angularly shifted by 60°. Such rotor 18 is placed in a cage 44 essentially serving to position it correctly and reliably at the center of the two principal stator parts 4, 6 and to facilitate the assembly of the motor.

In order to rigidify the motor assembly and to set the first principal stator part 4 into a fixed position relative to the second principal stator part 6, there is provided a non-magnetic spacer 45 placed between the first and the second principal stator parts 4 and 6, such spacer being formed by a single piece in the middle of which is provided an opening for the rotor 18 and the cage 44. Such spacer 45 has the form of a ring of planar structure in which three positioning grooves are provided on each side. Each groove corresponds to the profile of the polar arm which is inset therein. Finally, the material employed for such spacer 45 will advantageously have elastic properties in order that each coupling lug 32, 34 may be correctly secured to the corresponding polar lug 24a, 24b, 24c of the respective first and second principal stator parts 4 and 6.

Referring now more particularly to FIGS. 4 and 5, there will be described hereinafter the operation of this first embodiment of the three-phase motor hereinbefore described.

Each magnetic circuit of the motor comprises a single magnetic flux guidance branch respectively 8a, 8b, 8c on which is situated a respective coil 10a, 10b, 10c capable of generating a magnetic flux in the core 30 of such branch. Next, each of said magnetic flux guidance branches, respectively 8a, 8b, 8c is associated with only two magnetic circuits 46, 48, such as described by the arrows on FIGS. 4 and 5. Finally, each of such magnetic circuits comprises two magnetic poles belonging to the first principal stator part 4 and two magnetic poles belonging to the second principal stator part 6.

The flux generated by a respective coil 10a, 10b, 10c in the core 30 of a respective magnetic flux guidance branch 8a, 8b, 8c associated with a first magnetic pole belonging to the first stator part 4 and to a second magnetic pole belonging to the second stator part 6 permits the generation of a magnetic flux having substantially equal density in the two magnetic circuits with which such coil is associated. On FIGS. 4 and 5 there has been shown by respective arrows 46, 48 the two magnetic circuits associated with coil 10c. The double arrows signify a section common to both magnetic circuits; an arrow flexing towards the exterior of the motor signifies that the circuit passes into a plane above the plane of the drawing while a flexing of the arrow towards the interior signifies that the circuit passes onto a lower plane.

It will be noted that the permanent magnet situated in the plane of the first principal stator part 4 is oriented relative to the permanent magnet 42 situated in the plane of the second principal stator part 6 in a manner such that when the direction of the polarization of the permanent magnet 40 is aligned with the direction of respective first magnetic poles 12a, 12b, 12c of the first principal stator part 4, the direction of polarization of the permanent magnet 42 is aligned in the inverted sense on the magnetic pole, of the second principal stator part 6 which is coupled by a respective magnetic flux guidance branch 8a, 8b, 8c to said first magnetic pole. In the case of the three-phase motor of FIG. 1, the resulting angular shift between the two directions of polarization of the permanent magnets 40 and 42 amounts to 60°.

It will be noted that such a motor may operate in a stepping mode or in continuous rotation. In accordance with the type of supply, the stepping motion will operate for instance with 3, 6 or 12 steps per revolution. It is naturally possible to provide positioning notches for the stepping mode.

Figure 6:
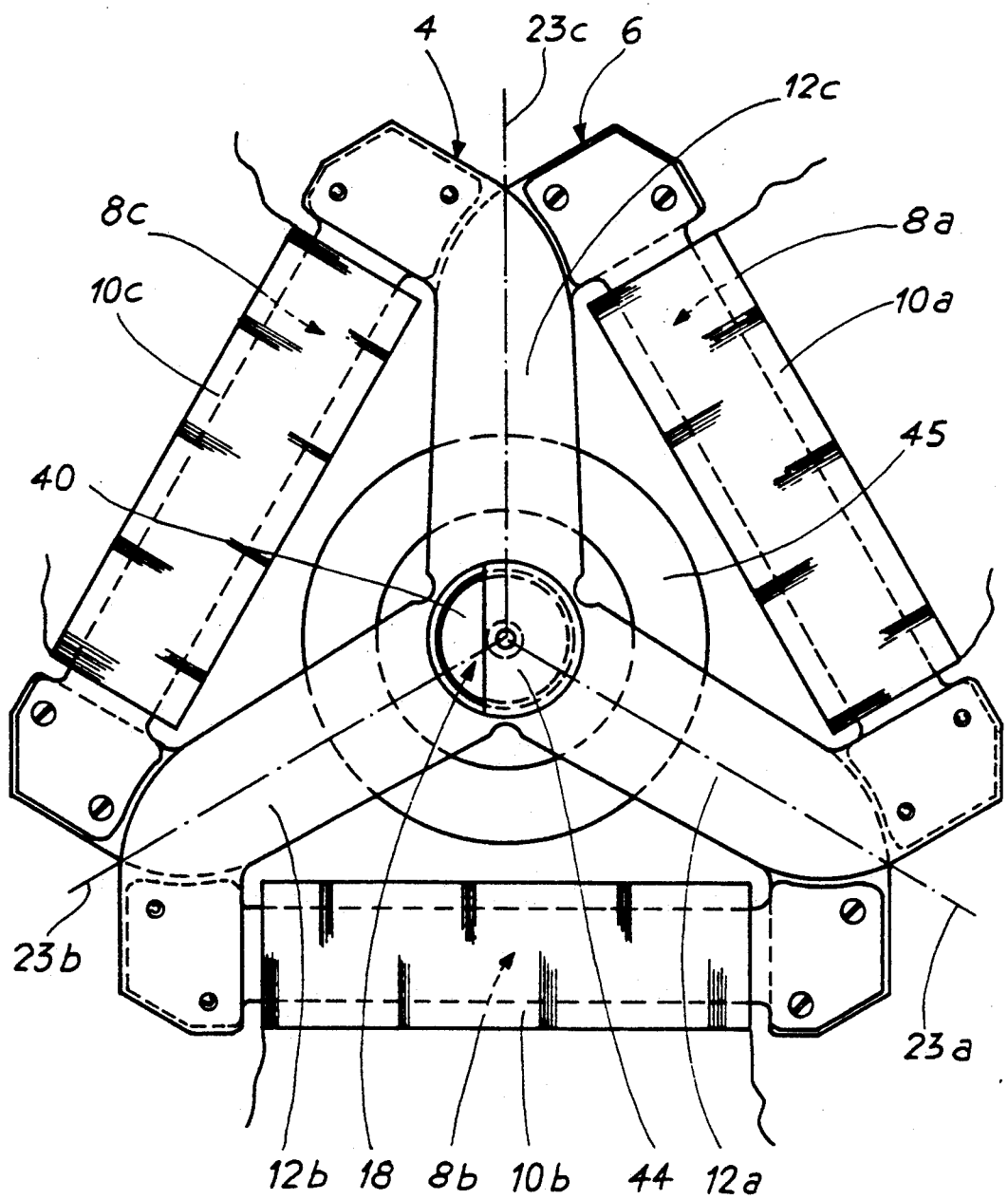
FIGS. 6 and 7 are respective plan views of a first and second variant of the first embodiment described in FIG. 1.
Figure 7:
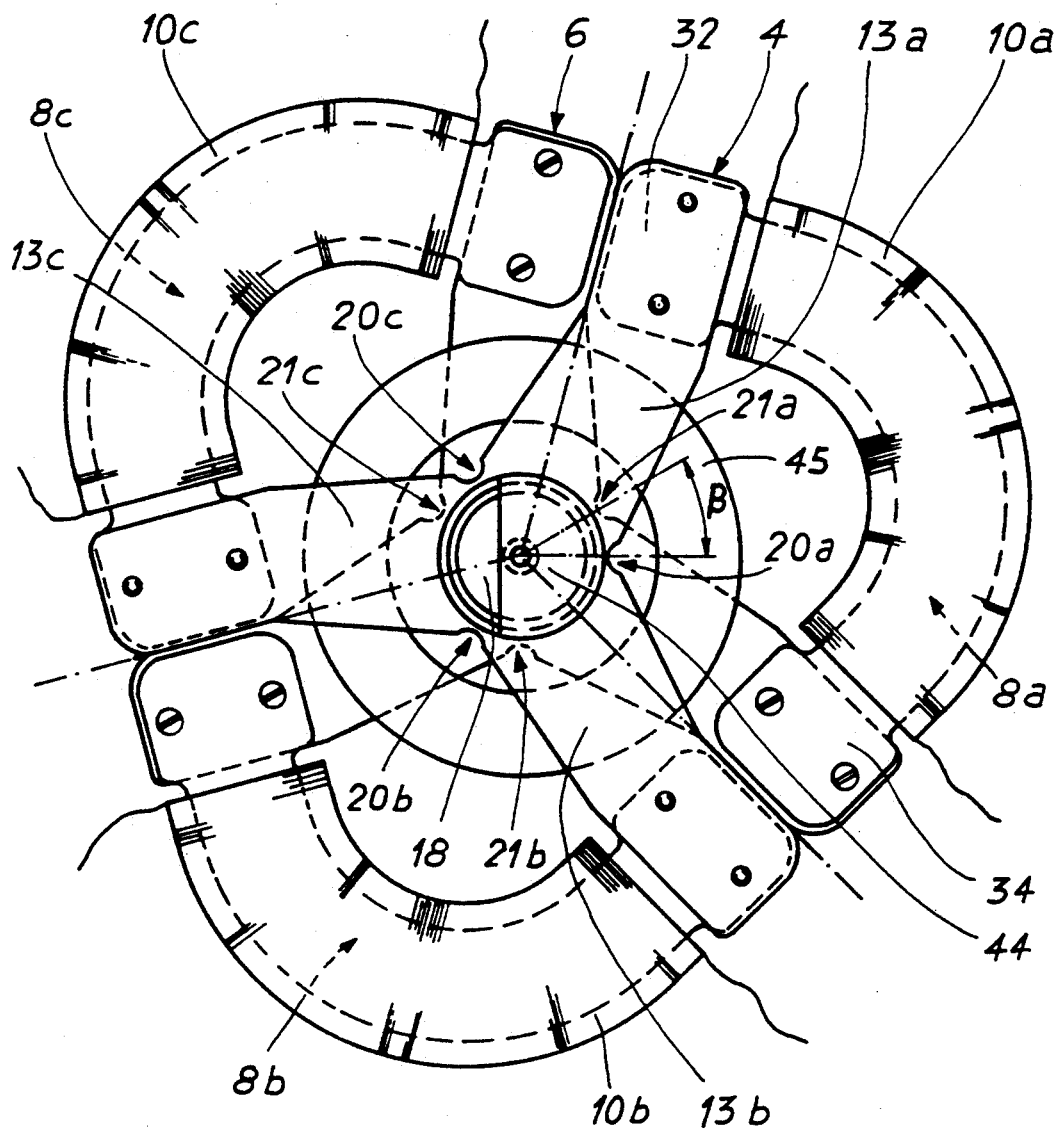

FIGS. 6 and 7 are two variants of the first embodiment of the three-phase motor according to the invention described hereinbefore. FIG. 6 is distinguished from FIG. 1 primarily by the fact that coils 10a, 10b, 10c are rectilinear. FIG. 7 shows the particularity of an angular shift between the necks 20a, 20b, 20c of the first principal stator part 4 and the necks 21a, 21b,21c of the second principal stator part 6. Poles 13a, 13b, 13c have a substantially rectilinear form and the coupling lugs 32, 34 advantageously have a substantially rectangular form while exhibiting the essential characteristic of non-superposition between the polar lugs of the first stator part and the polar lugs of the second stator part. In this variant, the direction of magnetization of the second permanent magnet 42 relative to the direction of magnetization of the first permanent magnet 40 is angularly shifted through an angle of $180° - (120 - \beta)° = (60 + \beta)°$.

Figure 8:
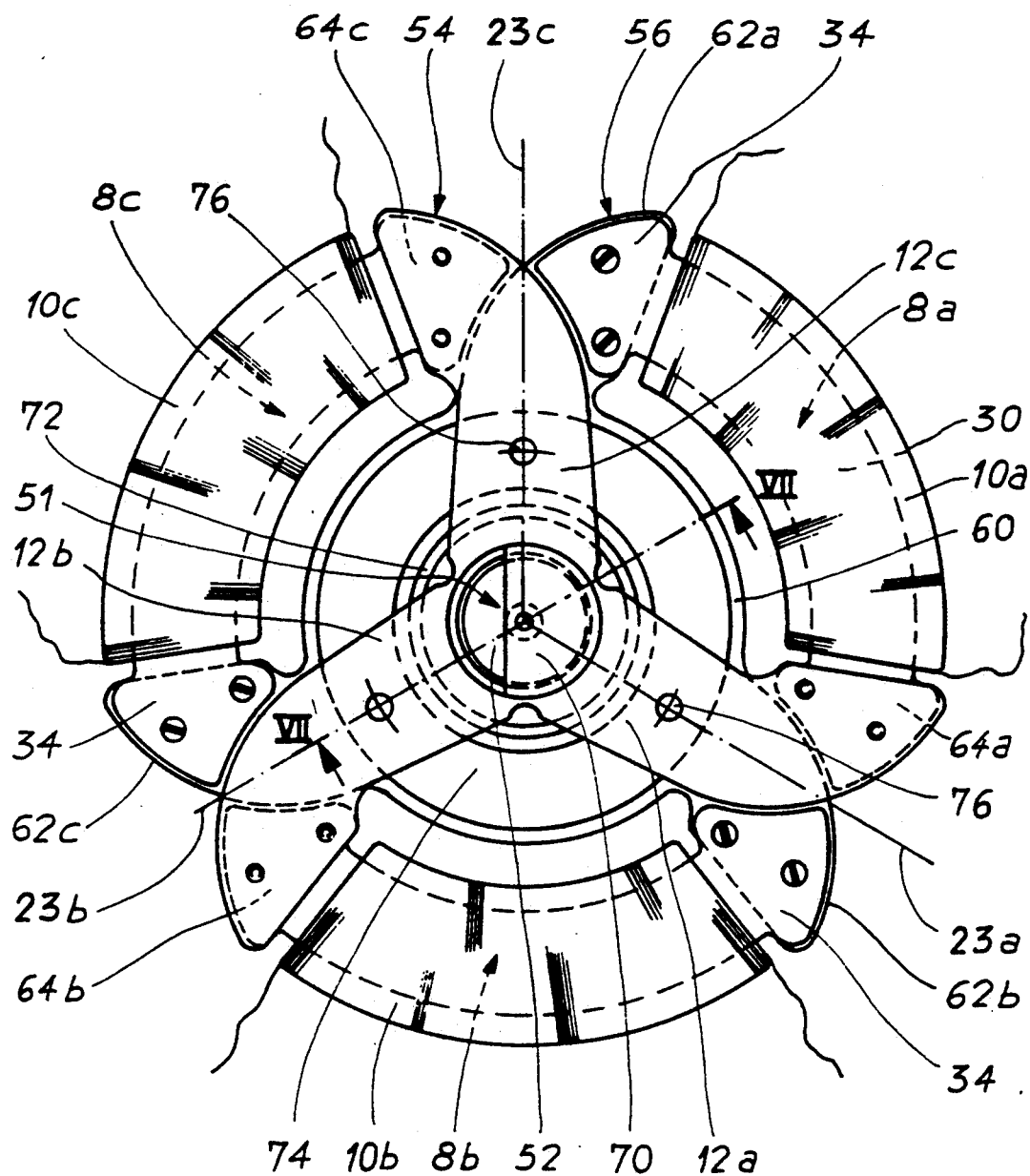
FIG. 8 represents a plan view of a second embodiment of a three-phase motor according to the invention.

Referring now to FIG. 8, there will be described hereinafter a second embodiment of a three-phase motor in accordance with the invention.

In this second embodiment, rotor 51 no longer includes more than one single bipolar permanent magnet 52 situated in the plane of the first principal stator part 54. As in the first embodiment previously described, this three-phase motor primarily possesses a structure on three neighbouring parallel planes. In the two outer planes are situated respectively first and second principal stator parts 54 and 56. The first stator part 54 as well as the magnetic flux guidance branches 8a, 8b, 8c are identical with the first embodiment described hereinbefore. In contrast, the second principal stator part 56 presents a form which is different from the first principal stator part 54. Such second principal stator part 56 is primarily formed by a ring 60 of circular form and planar structure as well as three arms 62a, 62b, 62c having substantially the form of an arc of a circle. The end of each of such arms 62a, 62b, 62c forms a profiled attachment lug in order to be coupled to the respective second lugs 64a, 64b, 64c of the magnetic flux guidance branches 8a, 8b, 8c. In a manner equivalent to the first embodiment, the second attachment lugs 34 secured to the respective lugs of arms 62a, 62b, 62c are situated entirely on the same side of the respective radial lines 23c, 23a, 23b defined by the respective poles 12c, 12a, 12b belonging to the first principal stator part 54.

The second principal stator part 56 in this embodiment is formed from a single piece of low magnetic reluctance. Thus the magnetic flux may freely flow from one arm 62a, 62b, 62c to another arm of such piece. This second principal stator part 56 thus serves primarily to form the magnetic circuits of the motor.

Figure 9:
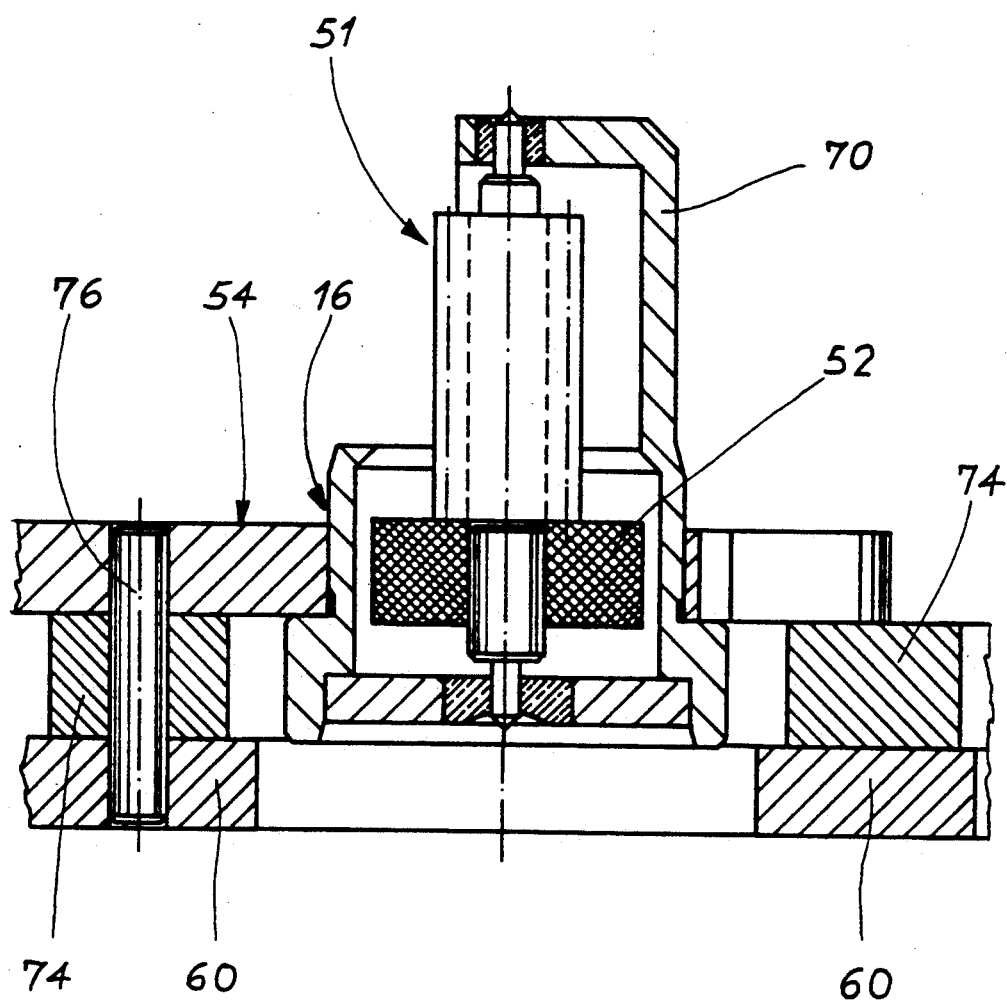
FIG. 9 is an enlarged cross-sectional view of the region of the rotor of the motor of FIG. 8.

On FIG. 9 is shown the arrangement of the rotor cage 70 at the center of the motor. It will be noted that the opening 72 defined by the annular part 60 of the second principal stator part 56 and by the spacer 74, which serves to rigidify the motor, has been provided with a diameter greater than the maximum diameter of the rotor cage 70. In order to position spacer 74 and to fasten the two principal stator parts 54 and 56, there have been provided positioning pins 76.

Figure 10:
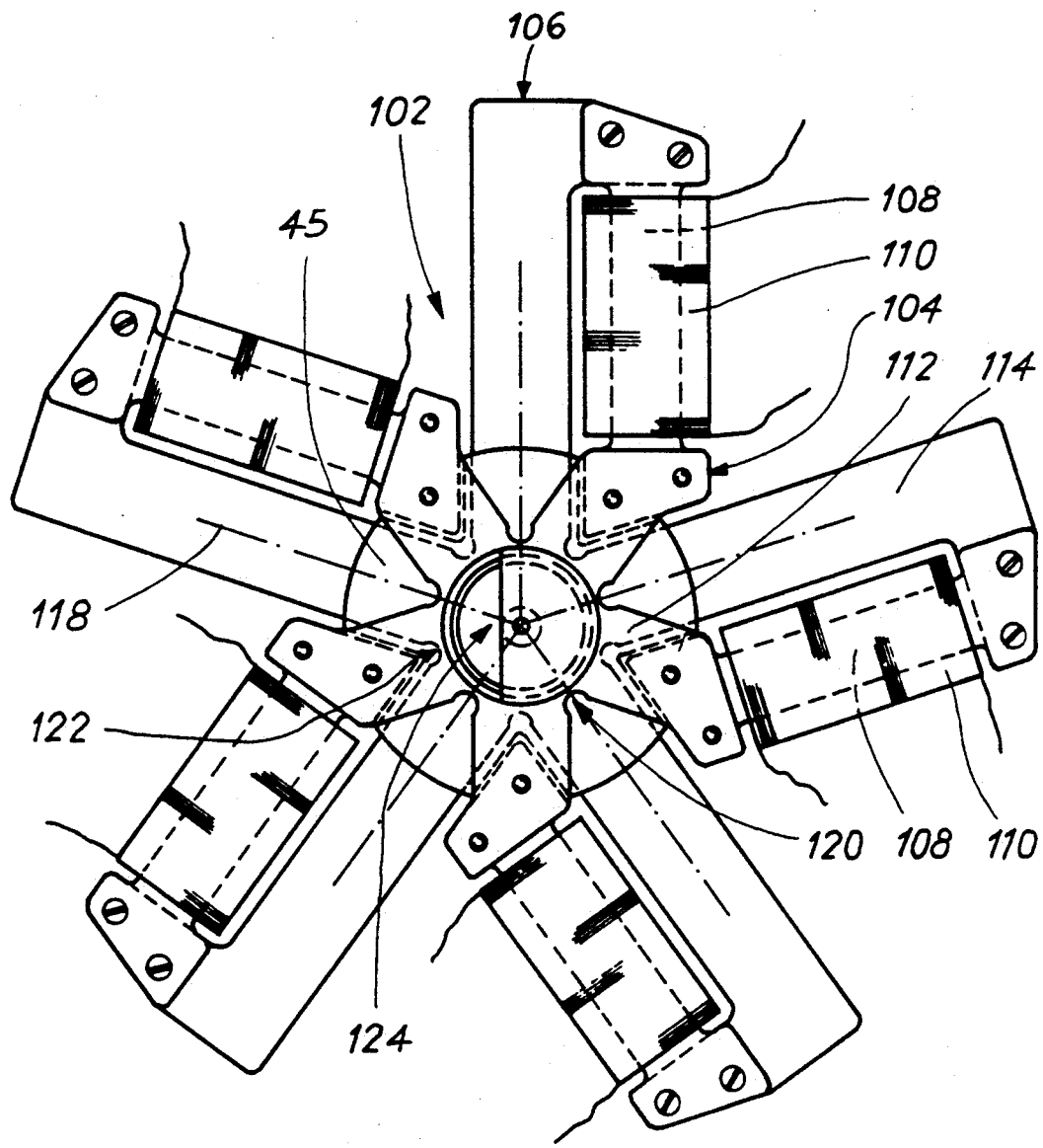
FIGS. 10 and 11 represent respective first and second variants of an embodiment of a five-phase motor in accordance with the invention.

Referring to FIG. 10, there will hereinafter be described a third embodiment of an electro-magnetic motor in accordance with the invention.

The motor described by FIG. 10 is a five-phase version of the electro-magnetic motor in accordance with the invention. Stator 102 of this five-phase motor primarily possesses a structure on three neighbouring parallel planes. As in the case of the other embodiments, such motor comprises two principal stator parts 104 and 106 and branches 108 serving as magnetic flux guidance means between the two principal stator parts 104 and 106. On each of such branches 108 is provided a coil 110 intended to be coupled to an electrical supply in order to generate a magnetic flux in the branch with which it is associated.

Each of the two principal stator parts 104 and 106 is formed from a single planar piece. The magnetic flux guidance branches 108 intermediate to the two principal stator parts 104 and 106 are themselves also of planar form.

In this embodiment, the arms 112 of the first stator part 104 are of a different form from those of the arms 114 of the second principal stator part 106. The magnetic flux guidance branches 108 are arranged parallel to the radial line 118 defined by the polar arm 114 of the second principal stator part 106. In an advantageous manner, the necks 120 of the first principal stator part 104 are angularly shifted by an angle of 36° relative to the necks 122 of the second principal stator part 106. However, the angular shift between the necks 120 of the first stator part 104 and the necks 122 of the second stator part 106 may vary by an angle comprised between 0° and 72° in other variants of this embodiment of a five-phase motor in accordance with the invention.

In this embodiment, rotor 124 comprises two permanent magnets, the magnetization direction of which is angularly shifted by an angle of 144°. Generally speaking, if the angular shift between the necks 120 of the first stator part 104 and the necks 122 of the second stator part 106 is equal to α°, the angular shift between the first and the second bipolar permanent magnet of the rotor 124 is equal to (180−α)°.

It will be noted that it is possible to provide an embodiment of a five-phase motor according to the invention which is equivalent to the second embodiment of the three-phase motor according to the invention described hereinbefore. In this case, the rotor will comprise a single permanent magnet.

The operation of this embodiment of a five-phase motor is similar to the operation of the previous embodiment.

Figure 11:
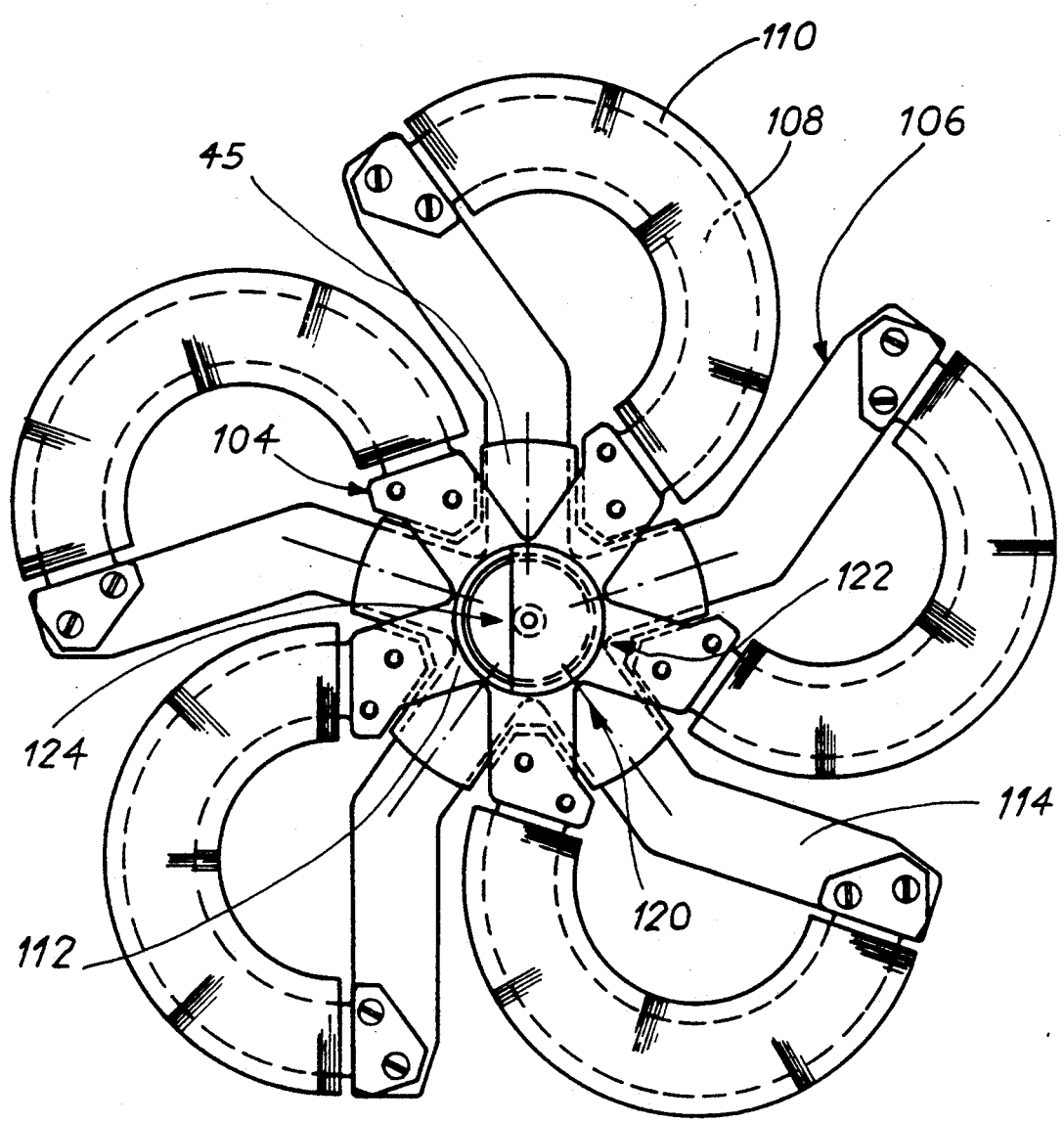

On FIG. 11 is presented a variant of the third embodiment described hereinbefore. In this variant, the configuration as given enables the optimization of the length of the coils relative to the total space occupied.

It will be noted that it is possible to construct two-phase motors on the principle of the invention with two principal stator parts exhibiting the form of a cross. It will be further noted that the motor according to the invention may have a number of phases greater than five, since nothing prevents the increase in the number of arms of each principal stator part as well as the number of coils necessary for supplying the motor.

Finally, although in the preceding description there have been described only embodiments relating to a motor, it is well understood that the invention is equally applicable to other types of transducers such as generators for example.

What is claimed is:

1. A polyphase electromagnetic transducer, in particular a drive motor comprising:
   a stator including first and second principal parts, the first principal part defining a stator hole and including at least three magnetic poles, each of such magnetic poles comprising a polar expansion at one end thereof partially defining said stator hole and a polar lug substantially at another end thereof, said lug serving as a magnetic contact, said polar expansions being separate from one another by zones of high magnetic reluctance, said second principal stator part serving to form part of the magnetic circuits of said motor, said stator further including at least three magnetic flux guidance branches, each of such branches magnetically coupling a polar lug of said first principal stator part to said second principal stator part;
   a rotor rotatably mounted in said stator hole and including at least one permanent magnet, such rotor being adapted to spin in order to furnish a driving couple to a mechanism to be driven;
   at least two coils each mounted on one of said magnetic flux guidance branches, each coil being intended for coupling to an electrical supply source so as to generate a magnetic flux in its associated branch; wherein said first and second principal stator parts of such transducer are situated primarily in two different planes and are at least partially superimposed, each of said magnetic flux guidance branches bearing one of said coils being situated primarily in a region intermediate said principal stator part planes.

2. A transducer as set forth in claim 1 wherein said principal stator parts are parallel and have an essentially planar form.

3. A transducer as set forth in claim 1 wherein said magnetic flux guidance branches have a substantially rectangular cross section and are primarily situated in a single common plane.

4. A transducer as set forth in claim 1 wherein each of said magnetic flux guidance branches comprises a core and two coupling lugs, each of said coupling lugs being superimposed solely over a single one of the two principal stator parts.

5. A transducer as set forth in claim 1 wherein further comprising a spacer situated in said region intermediate the two principal stator parts and including grooves provided on the surface thereof said first principal part of said stator including polar arms intermediate the polar expansions and corresponding ones of said polar lugs, said polar arms being inset in corresponding ones of said grooves.

6. A transducer as set forth in claim 1 in which said rotor is placed in a rotor cage inserted into said stator hole.

7. A transducer as set forth in claim 1 wherein said magnetic flux guidance branches are in the form of circular arcs of equal radius of curvature, each of said arcs having the same center.

8. A transducer as set forth in claim 1 wherein said rotor includes first and second bipolar permanent magnets, the second bipolar permanent magnet being situated in a plane defined by said second principal stator part and wherein this latter is primarily formed by magnetic poles arranged around a second stator hole aligned with said stator hole of the first principal stator part, the number of such poles being equal to the number of magnetic poles of said first principal stator part, each magnetic flux guidance branch coupling a single pole of the first principal stator part to a single pole of the second principal stator part.

9. A transducer as set forth in claim 8 wherein said second principal stator part is identical in form to said first principal stator part and arranged in an inverted manner relative to the latter.

10. A transducer as set forth in claim 1 comprising three phases.

11. A transducer as set forth in claim 1 comprising five phases.

* * * * *